Oct. 25, 1966 D. K. STUDENICK 3,281,660
LOCATOR FOR MAGNETIC AND CONDUCTING MATERIALS INCLUDING
MEANS FOR ADJUSTING THE RELATIVE POSITIONS
OF A PAIR OF SENSING COILS
Filed May 28, 1964 2 Sheets-Sheet 1
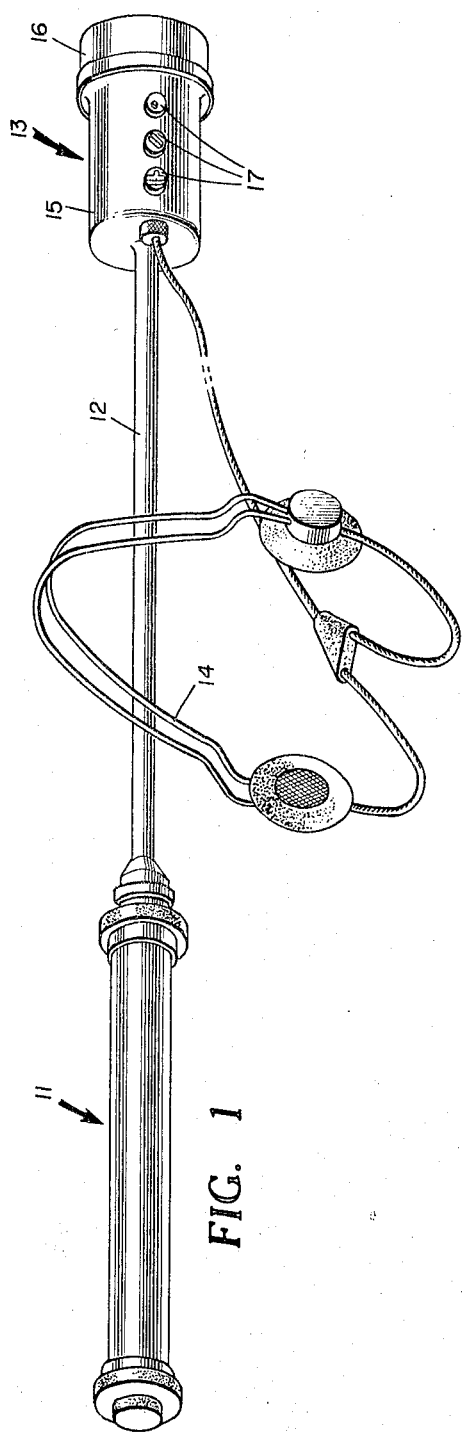
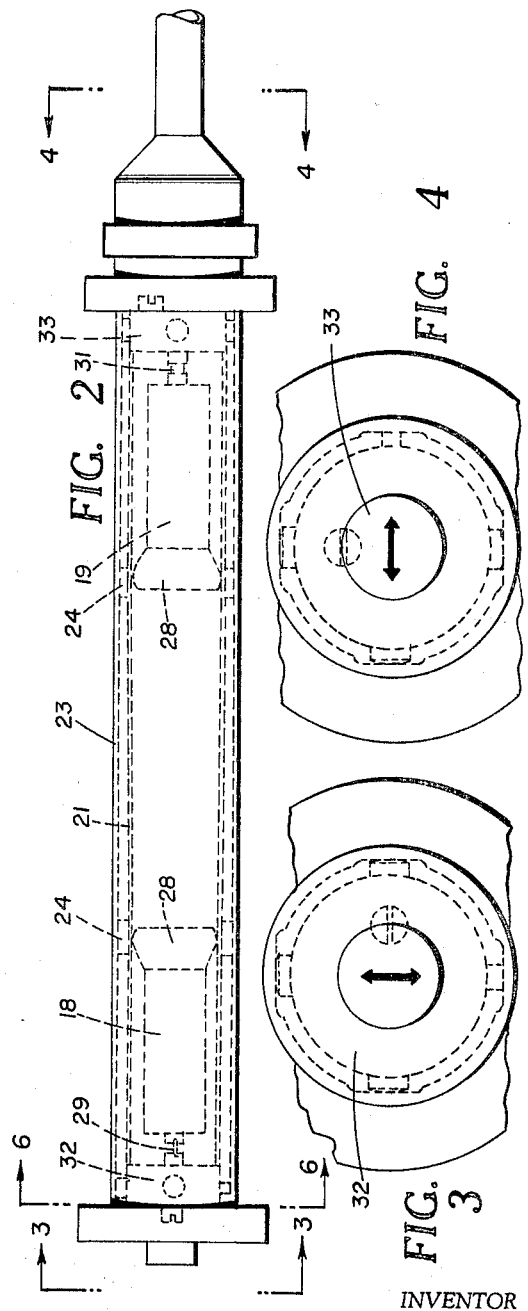
INVENTOR
David K. Studenick
BY [signatures]
ATTORNEY
AGENT

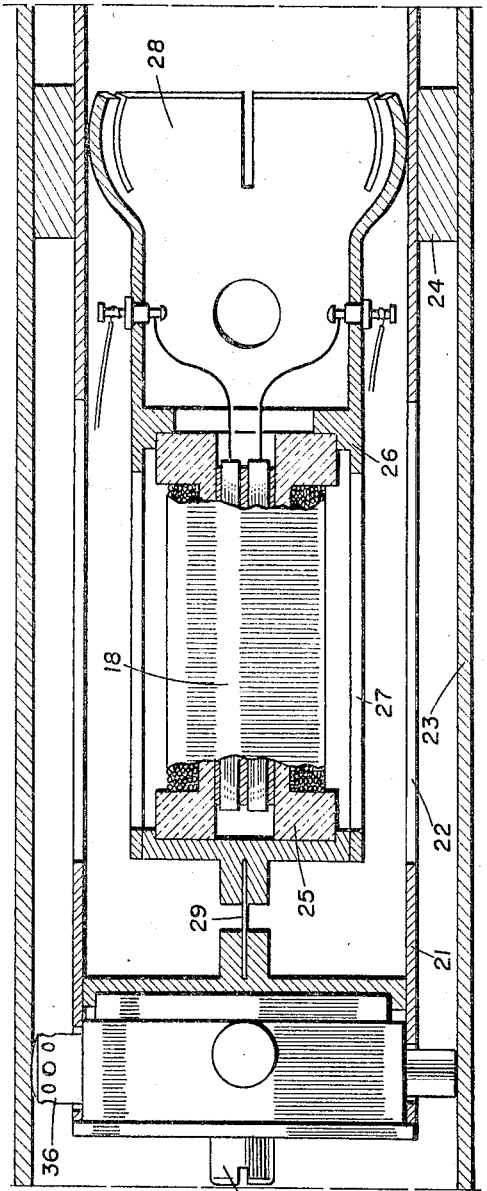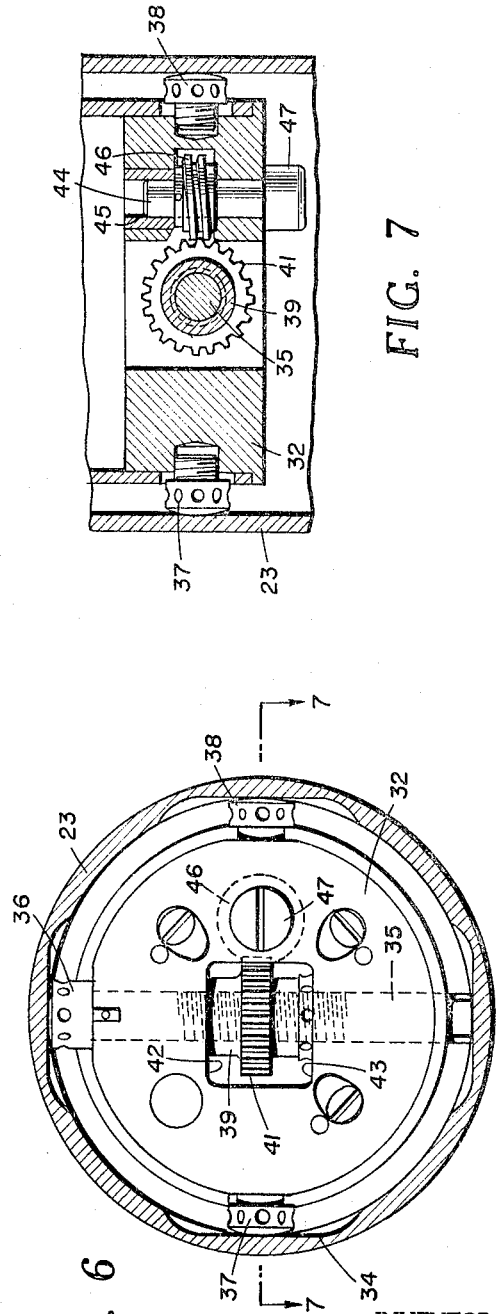

United States Patent Office 3,281,660
Patented Oct. 25, 1966

3,281,660
LOCATOR FOR MAGNETIC AND CONDUCTING MATERIALS INCLUDING MEANS FOR ADJUSTING THE RELATIVE POSITIONS OF A PAIR OF SENSING COILS
David K. Studenick, Beltsville, Md., assignor to the United States of America as represented by the Secretary of the Navy
Filed May 28, 1964, Ser. No. 371,151
7 Claims. (Cl. 324—3)

The invention described herein may be manufactured and used by or for the Government of the United States of America for governmental purposes without the payment of any royalties thereon or therefor.

The present invention relates to instruments for detecting and indicating the presence and location of a hidden mass of metallic material which has a different effect upon the device than does the surrounding environment, such as detecting and locating ordnance which is either buried below the earth's surface or submerged in the sea. The device of the present invention, although suitable for detecting and locating hidden metallic objects of various types, is particularly adapted for use as an ordnance locator and is designed to be of such size, shape, and weight as to facilitate effortless and safe operation of the device either on shore or underwater and further having a new and improved sensing coil alignment mechanism in the probe to provide means for obtaining precise alignment of the coils and maintaining the coils in their aligned positions.

In the past, ordnance locators have been heavy, bulky, and have had poor weight distribution, thus making the operation of the device quite awkward and burdensome, particularly when the device is used underwater by divers looking for buried mines or other sunken objects. Moreover, there has long been a need for an ordnance locator having a capability for the accomplishment of accurate positioning of the sensing oils with the degree of precision required in such an instrument and yet being rugged enough to maintain the coils in their adjusted positions even after the device has been subjected to vibrations and shocks of the type normally encountered by such devices. The present invention possesses all of the advantages characteristic of previous devices but suffers none of the disadvantages thereof.

The general purpose of this invention is to provide an ordnance locator which is lightweight, compact, and hydrodynamically shaped to enable underwater operation of the device with a minimal effort required by the operator. This is achieved by constructing the device of lightweight materials and designing it to have a long slim configuration which consequently has very little drag in water irrespective of the particular attitude of the instrument. The present invention also provides a coil adjustment mechanism which isolates the ceramic form and the sensing coils thereon from any adjusting forces, the ceramic form for the coils being prone to breaking under slight bending moments applied thereto. This invention provides coil holders within which the coils are securely mounted and the coil holders are pivotally mounted within an adjustment tube, the tube then being flexed at its end portions in mutually perpendicular planes to adjust the relative positions of the coils therein. The coils are pivotally mounted within the tube at one end by means of a ball joint connection and at their other ends by flexural springs. As the tube is deflected to adjust the coils, the ball joints and flexural springs isolate the fragile coils from the adjusting forces but still assure the proper re-positioning of the coils in their adjusted positions.

An object of the present invention is the provision of an ordnance locator which has a self-contained power source and which is lightweight, compact, and of balanced weight distribution.

Another object of this invention is to provide an ordnance locator for use underwater which is of watertight construction and is almost buoyant in seawater.

A further object of the invention is the provision of an ordnance locator having a precision coil adjustment means which isolates the coils from any harmful mechanical forces and locks the coils in their adjusted positions.

Another object of this invention is the provision of an ordance locator which is free of external apparatus other than a set of headphones and thereby minimizes the possibility of entanglement with other objects and facilitates rapid jettisoning of the instrument when necessary.

Other objects and many of the attendant advantages of this invention will become apparent from the following detailed description when considered in conjunction with the accompanying drawings in which like reference numerals designate like parts throughout the various figures thereof and wherein:

FIGURE 1 shows a perspective view of a preferred embodiment of the present invention;

FIGURE 2 illustrates a side elevational view of the probe section of the device shown in FIGURE 1 with the internal parts shown by dashed lines;

FIGURE 3 shows an end view of the device taken on line 3—3 of FIGURE 2, looking in the direction of the arrows;

FIGURE 4 shows an end view of the device taken on line 4—4 of FIGURE 2;

FIGURE 5 shows a sectional view of the left portion of the probe shown in FIGURE 2;

FIGURE 6 illustrates a sectional view of the adjustment mechanism as seen from line 6—6 of FIGURE 2; and FIGURE 7 shows a sectional view of the adjustment mechanism taken on line 7—7 of FIGURE 6.

As shown in FIG. 1, the ordnance locator of the present invention has four basic elements; i.e., a probe shown generally at 11, a handle 12, an electronics housing shown generally at 13, and a set of headphones 14 to be worn by the operator. The probe, handle, and electronics housing are each constructed of a lightweight non-magnetic metal and, as seen in FIGURE 1, are assembled to define a long slender cylindrical instrument having a hydrodynamic shape which creates very little drag upon movement through water irrespective of the attitude in which the instrument is held. The handle 12 is of sufficient length to provide suitable separation between the probe and the electronic components. The handle is tubular and is threaded on each end for threaded coupling with the probe and the electronic housing to provide ease of assembly and also provide a watertight means to electrically connect together the probe and the electronic housing. The electronic housing comprises a main body portion 15 of cylindrical configuration which is closed at each end by transverse walls. Cup-shaped internally threaded end cap 16 is mounted upon body portion 15 at an externally threaded flared portion thereof which when assembled defines a battery compartment. The battery compartment is hermetically sealed from the electronic components housed in body portion 15 by means of the transverse end wall therebetween, and suitable plug-in connectors provide electrical connection of the battery and electronic components on opposite sides of said end wall. Since the electronic components within body portion 15 are at all times hermetically sealed, the batteries may readily be changed when necessary without the entrance of dust, dirt, or moisture into the electronic components. For convenience of operation in darkness or underwater, the control knobs 17 are each designed to have a unique shape so that the operator is able to ascertain their settings by sense of touch. In its preferred embodiment, the instrument is approximately five feet long and weighs about fourteen pounds on land and may be made to weigh only about one-half pound underwater. The low weight of the instrument underwater may be attributed in part to its own buoyancy and is also the result of a hollow cup-shaped float, not shown, which is adapted to be threaded onto the front end of the probe to provide additional buoyancy. The size of the float is selected to make the whole instrument almost buoyant in seawater so that the instrument may be handled easily underwater with a minimum of diver fatigue. The device, as shown in FIG. 1, has its own power supply contained in compartment 16 and therefore does not require any external cables leading to a portable power supply. Being free of any external cables and related apparatus, except for the necessary headphones, the instrument of this invention may be operated with freedom from entanglement with other objects. Moreover, this device may be quickly jettisoned by a diver in trouble by merely flipping off the headphones and dropping the instrument.

The probe assembly, as best seen in FIGS. 2 and 5, comprises a pair of sensing coils 18 and 19 coaxially positioned within opposite ends of a resilient non-magnetic metal tube 21 which has cut-out portions to define longitudinal slots 22 therein in the area of each coil. The resilient tube 21 is concentrically mounted within a rigid metallic protective sleeve 23 and is securely fixed in place by a pair of annular metal rings 24 which are force fitted into position to rigidly mount the resilient tube concentrically within sleeve 23.

The coils normally used in such a probe have a ceramic core or coil form which is easily broken if bending moment are applied thereto and it is for this reason that measures are taken to isolate the coils from such forces. Each coil is mounted within a cylindrical metallic coil holder 26 which has longitudinally extending slots 27 formed therein to minimize interference with the magnetic lines of flux. Each coil holder has an enlarged spherical portion 28 formed on the inner end thereof and having slots therein to give resiliency to the segments of the sphere. The external diameter of the sphere is slightly larger than the internal diameter of the tube 21 so that when the coil holder is pushed into the tube, a ball joint type of pivotal mounting is created at the inner end of each coil. At their outer ends, each coil holder has as a part thereof an end plate to which is fixedly secured a flat flexural leaf spring 29 and 31, respectively. The flexural springs are both positioned on the common axis of the coils but are disposed in mutually perpendicular planes, as seen in FIG. 2. Securely connected to the left end of tube 21 is an adjustment block 32 arranged to be selectively moved vertically within sleeve 23 and having the outer end of flexural spring 29 fixedly secured thereto. Firmly secured to the right end of tube 21 is a second adjustment block 33 arranged to be selectively moved within sleeve 23 in a horizontal plane perpendicular to the axis of the probe, as seen in FIG. 2, and having the outer end of flexural spring 31 connected thereto. The direction of movement of the adjustment blocks 32 and 33 in planes which are mutually perpendicular and normal to the axis of the probe is more evident from an inspection of FIGS. 3 and 4 and the lines from which those figures were taken, whereby the direction of movement of each block is indicated by the heavy double arrows.

The details of the adjustment blocks and the associated mechanisms are more readily apparent from an inspection of FIGS. 6 and 7 wherein it may be seen that sleeve 23 has four flat bearing surfaces 34 milled into the inner peripheral surface thereof and arranged in quadrature about the axis thereof adjacent the ends of said sleeve. Block 32 has a through aperture formed therein to receive a rod 35 which is externally threaded at least at its central portion. The length of rod 35 may be varied by a threaded stud 36 on one end thereof until rod 35 bears against both of a pair of oppositely disposed flat bearing surfaces 34. Block 32 has a pair of studs 37 and 38 threaded into the sides thereof to firmly abut against the other two flat bearing surfaces in the sleeve and thereby prevent right or left movement of block 32 but permit vertical movement of the block, as viewed in FIG. 6. Mounted for threaded engagement with rod 35 is an internally threaded annular collar 39 having a worm gear 41 formed on the outer peripheral surface thereof. Collar 39 is partially received within a square aperture formed in the block and is disposed to abut against the upper and lower shoulders, 42 and 43 respectively, of the square aperture. A drive shaft 44 is rotatably mounted in a bearing 45 mounted in block 32 and is disposed with its axis perpendicular to the axis of rod 35 and parallel to the axis of the probe. Screw threads are formed on a portion of the outer peripheral surface of drive shaft 44 to define a worm 46 disposed for operative engagement with worm gear 41 on collar 39. The outer end of drive shaft 44 is provided with a screw head 47 which, when rotated, turns worm 46 which meshes with worm gear 41 to rotate collar 39. As the collar rotates, it is caused to travel up or down the threaded portion of rod 35 and, by virtue of the abutting contact of the ends of the collar with shoulders 42 and 43 of the adjustment block, the collar causes the block to move with it. Movement of block 32 with the collar causes the end portion of tube 21 to be deflected in the direction of block movement by virtue of the mechanical connection therebetween. Because the coils are positioned within the end portions of tube 21, the coil positions are adjusted as the ends of the tube are deflected, the amount of deflection and adjustment being determined by the rotation of worm 46. The coils are isolated from the bending moment applied by the adjustment means because the ball joint connection 28 permits the coil and coil holder to pivot within tube 21 and the flexural spring 29 bends to relieve the coil from the bending forces. The flexural springs provide a mechanical connection which absorbs the bending moment applied during adjustment of the coils but prevents coil movement in all directions other than in the plane of spring flexure. Although the details of the adjustment mechanism have been discussed with reference only to block 32, it is to be understood that a similar adjustment mechanism is provided in adjustment block 33.

From the foregoing, it is seen that the present invention provides an ordnance locator suitable for use on land or underwater with a degree of convenience, ease, and safety heretofore unobtainable by conventional apparatus. The present invention further includes a novel and advanced coil adjustment mechanism which precisely adjusts the positions of the coils and maintains the coils in those positions; and in the course of adjustment, the mechanical force applied by the adjustment mechanism is caused to act upon a resilient tube within which the fragile coils are mounted in a manner to be relieved from the adjustment forces.

Obviously many modifications and variations of the present invention are possible in the light of the above teachings. It is therefore to be understood that within the scope of the appended claims the invention may be practiced otherwise than as specifically described.

What is claimed is:
1. A probe for an instrument which detects distortions of the earth's magnetic field, comprising
    a rigid cylindrical sleeve,
    a resilient tube concentrically positioned within said sleeve and securely connected thereto at the midsections of said tube and said sleeve,
    first and second sensing coils mounted in the resilient tube, said coils being normally coaxially aligned within the resilient tube at opposite ends thereof, and first adjustment means connected to one end of said tube and the adjacent end of said sleeve for selectively bending said end of the resilient tube in a first plane, second adjustment means connected to the other end of said tube and the other end of said sleeve for selectively bending that end of the resilient tube in a plane perpendicular to the first plane, whereby the relative positions of the coils may be selectively varied.

2. The probe of claim 1 further comprising first and second coil holders for securely holding said first and second coils respectively, said coil holders having spherical end portions at the inner ends thereof which contact the inner peripheral wall of the tube to form ball joint pivotal connections of said coil holders within said tube, said coil holders being connected at their other ends to their respective adjustment means, whereby the coil is isolated from the bending forces applied to the resilient tube.

3. The probe of claim 2 wherein the connections between the first and second coil holders and their respective adjustment means comprises first and second flat flexural springs connected thereto, said springs being disposed in mutually perpendicular planes and the plane of each spring being perpendicular to the direction of movement of the respective tube end, whereby each coil is further relieved from bending forces and is restricted from movement in all directions other than the direction of movement of the respective tube end.

4. The probe of claim 1 wherein each of said adjustment means comprises an end block secured to the end of said tube and having a worm screw rotatably mounted thereon, a threaded rod abutting against opposite wall portions of said sleeve, an annular collar having internal threads formed therein and being threaded upon said rod, said collar having a worm gear formed on the outer peripheral surface thereof in operative engagement with said worm screw and having portions in abutting contact with said block, whereby rotation of said worm screw rotates the collar on said shaft to move the block and bend the end portion of the resilient tube and thereby adjust the relative positions of the coils.

5. A probe for sensing changes in the earth's magnetic field comprising an elongated cylindrical rigid sleeve of non-magnetic material, a resilient tube of non-magnetic material concentrically disposed within said sleeve, annular support means disposed centrally of longitudinal axis of the sleeve and tube and positioned between and in contact therewith to mount the tube concentrically within the sleeve and radially spaced therefrom, a first sensing coil positioned within one end of said tube, a second sensing coil positioned within the other end of said tube, said coils being pivotally mounted within said tube for limited relative movement in mutually perpendicular planes, coil adjusting means connected to each end of said tube and contacting said sleeve to deflect the end portions of the tube in mutually perpendicular planes to thereby adjust the relative positions of the coils.

6. The device of claim 5 wherein the coil adjusting means comprises first and second externally threaded shafts having first and second internally threaded collars threaded thereon respectively, said shafts being positioned within said sleeve perpendicular to the axis thereof at opposite ends of said sleeve and disposed in mutually perpendicular planes, first and second adjusting blocks fixedly secured to the ends of said tube and having through apertures formed therein to receive said first and second shafts respectively, said blocks having bearing surfaces thereon for abutting contact with said collars to permit relative rotative movement between said collars and said blocks while preventing relative lateral movement therebetween, said collars having gear teeth formed on the outer peripheral surfaces thereof to respectively engage first and second worm screws rotatably mounted in apertures formed in said blocks.

7. The device of claim 6 further comprising first and second coil holders for securely receiving said first and second coils respectively, said coil holders being pivotally mounted within said tube by means of ball joint pivots at their inner ends, said coil holders being connected to their respective adjusting blocks by means of flat flexural springs disposed in plane normal to the direction of movements of the respective coils.

References Cited by the Examiner

UNITED STATES PATENTS

| | | | |
|---|---|---|---|
| 2,321,356 | 6/1943 | Berman | 324—3 X |
| 2,442,805 | 6/1948 | Gilson | 324—3 X |
| 2,494,433 | 1/1950 | Erwin | 340—8 X |
| 2,698,921 | 1/1955 | Wharton | 324—52 |
| 2,744,232 | 5/1956 | Shawhan et al. | 324—3 |
| 2,870,427 | 1/1959 | Frank et al. | |
| 2,908,863 | 10/1959 | Neff | 324—67 |
| 2,993,167 | 7/1961 | Smith | 324—52 |
| 3,052,837 | 9/1962 | Arbogast et al. | 324—41 X |
| 3,214,686 | 10/1965 | Elliot et al. | 324—6 |

OTHER REFERENCES

Osborne, W. E.; Transistorized Metal Locator, Electronics World, pp. 86–88, March 1962.

WALTER L. CARLSON, *Primary Examiner.*

G. R. STRECKER, *Assistant Examiner.*